United States Patent [19]

Peek et al.

[11] Patent Number: 5,266,945
[45] Date of Patent: Nov. 30, 1993

[54] PAGING SYSTEM WITH ENERGY EFFICIENT STATION LOCATION

[75] Inventors: William H. Peek, Beaverton; Garold B. Gaskill, Tualatin, both of Oreg.

[73] Assignees: Seiko Corp.; Seiko Epson Corp., Japan

[21] Appl. No.: 642,131

[22] Filed: Jan. 15, 1991

Related U.S. Application Data

[63] Continuation of Ser. No. 367,014, Jun. 16, 1989, abandoned, which is a continuation-in-part of Ser. No. 352,635, May 12, 1989, Pat. No. 4,897,835, which is a continuation of Ser. No. 121,139, Nov. 16, 1987, which is a continuation-in-part of Ser. No. 202,844, Nov. 27, 1985, Pat. No. 4,713,808.

[51] Int. Cl.$^5$ ............................................. H04B 7/00
[52] U.S. Cl. ........................... 340/825.44; 340/825.47; 340/825.48
[58] Field of Search ........... 340/825.04, 825.44, 340/825.13, 825.47, 825.48, 311.1, 825.49; 455/161, 166, 185, 186, 31, 32; 379/57, 63

[56] References Cited

U.S. PATENT DOCUMENTS

| | | | |
|---|---|---|---|
| 3,755,782 | 8/1973 | Haas et al. | 340/825.08 |
| 4,247,908 | 1/1981 | Lockhart, Jr. et al. | 455/31 |
| 4,419,765 | 12/1983 | Wycoff et al. | 455/161 |
| 4,644,347 | 2/1987 | Lucas et al. | 340/825.04 |
| 4,888,815 | 12/1989 | Ahlemeyer et al. | 455/186 |
| 5,039,984 | 8/1991 | Andros et al. | 340/825.48 |
| 5,122,795 | 6/1992 | Cubley et al. | 340/825.44 |

FOREIGN PATENT DOCUMENTS

9106190  5/1991  World Int. Prop. O. ....... 340/825.44

*Primary Examiner*—Donald J. Yusko
*Assistant Examiner*—Dervis Magistre
*Attorney, Agent, or Firm*—Elmer Galbi

[57] ABSTRACT

A method for searching for a station carrying paging data without unduly draining the paging receiver battery. If a station to which the receiver is presently tuned becomes unreliable, the pager scans among channels listed in a local channel list. If no paging data is received on these channels, the scanning among the local list channels may optionally proceed for a further interval at a slower rate. After it appears that paging data will not be found on channels listed in the local list, the pager begins a full spectrum search at a slow rate until it again finds a channel carrying paging data. By this arrangement, battery power is expended at a rate roughly in accordance with the likelihood of finding a paging station.

3 Claims, 2 Drawing Sheets

PAGING SYSTEM WITH ENERGY EFFICIENT STATION LOCATION

RELATED APPLICATION

This application is a continuation of application Ser. No. 07/367,014 filed Jun. 16, 1989 now abandoned which is a continuation-in-part of copending allowed application Ser. No. 07/352,635, filed May 12, 1989, now U.S. Pat. No. 4,897,835. Ser. No. 07/352,635 is a continuation of abandoned application Ser. No. 07/121,139, filed Nov. 16, 1987, which in turn was a continuation-in-part of application Ser. No. 06/802,844, filed Nov. 27, 1985 now U.S. Pat. No. 4,713,808.

FIELD OF THE INVENTION

The present invention relates to paging systems, and more particularly relates to techniques for limiting the battery drain on a paging receiver as it searches for signals carrying paging data.

BACKGROUND AND SUMMARY OF THE INVENTION

Paging receivers sometimes include the capability to scan a number of frequency channels to locate a channel carrying the desired paging data. In simple pagers, the receiver simply tunes every channel in the paging spectrum until it finds a channel carrying the desired paging data. In more advanced systems, each paging transmitter may broadcast a list of alternative paging channels that are used in the area surrounding the transmitter. On finding one such station, a paging receiver is provided a small local list of other stations that it can examine for data if the original station is lost, obviating the need to scan the entire frequency spectrum. Such a system is disclosed in application Ser. No. 367,727 filed simultaneously herewith and entitled Paging System With Local Channel Lists.

The scanning process is energy intensive and reduces the battery life available for the more productive task of receiving pages. If a pager that relies on a local channel list is moved from the geographical area to which the list relates, the pager may exhaust its battery vainly searching for paging signals where there are none.

It is an object of the present invention to overcome this problem.

It is a more particular object of the present invention to search through successively less likely channels at successively slower rates to locate a channel carrying paging data.

BRIEF DESCRIPTION OF THE INVENTION

The present invention provides a method for searching for a station carrying paging data without unduly draining the paging receiver battery. If a station to which the receiver is presently tuned becomes unreliable, the pager scans among channels listed in a local channel list. If no paging data is received on these channels, the scanning among the local list channels may optionally proceed for a further interval at a slower rate. After it appears that paging data will not be found on channels listed in the local list, the pager begins a full spectrum search at a slower rate until it again finds a channel carrying paging data. By this arrangement, battery power is expended at a rate roughly in accordance with the likelihood of finding a paging station.

The foregoing and additional objects, features and advantages of the present invention will be more readily apparent from the following detailed description thereof, which proceeds with reference to the accompanying drawings.

DETAILED DESCRIPTION

For expository convenience, the present invention will be illustrated with reference to a paging system (the "Gaskill" system) described in U.S. Pat. No. 4,713,808 and in allowed application Ser. No. 07/121,139, later abandoned in favor of Ser. No. 352,635, now U.S. Pat. No. 4,897,835. However, it will be recognized that the invention is not so limited. The disclosures of these references are incorporated herein by reference.

Figure 1:
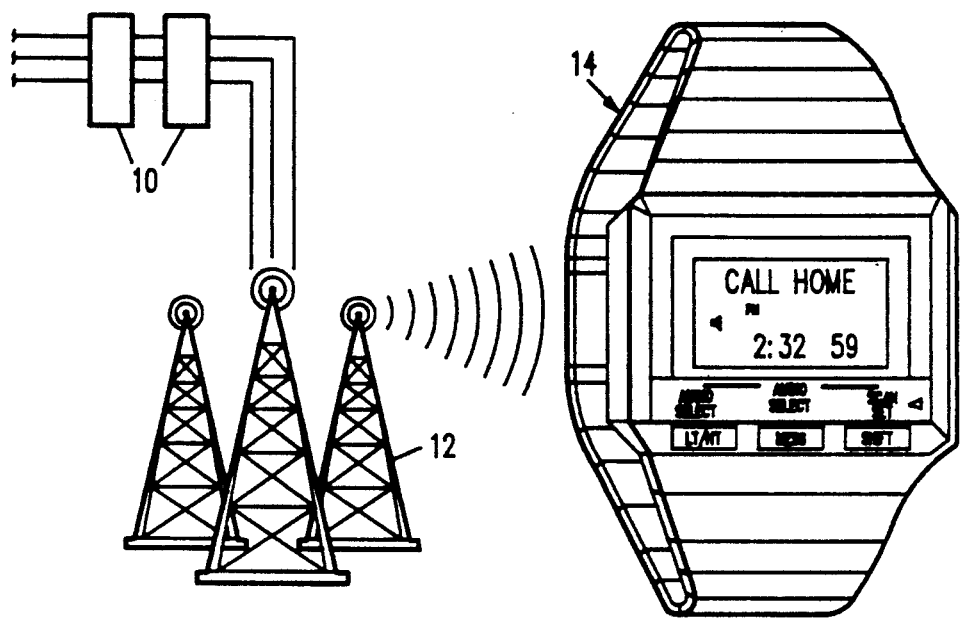
FIG. 1 is a schematic block diagram illustrating a paging system that may use the present invention.

As shown in FIG. 1, the Gaskill system includes clearinghouses 10, broadcasting facilities 12 and wristwatch paging receivers 14. The clearinghouses 10 are fully automated centralized facilities which accept messages, validate customer identification, determine message destinations and route messages to the appropriate broadcast facilities for transmission. Callers to the system dial a local clearinghouse telephone number and hear voice prompts that guide them through a simple process for sending messages.

The broadcast facilities 12 are typically conventional FM broadcast stations that carry paging data on subcarriers of their signals. Multiple stations are used for transmission in a given area. Diversity of signals combined with repeated transmission insures the paging subscribers receive their messages with a high degree of reliability.

Figure 2:
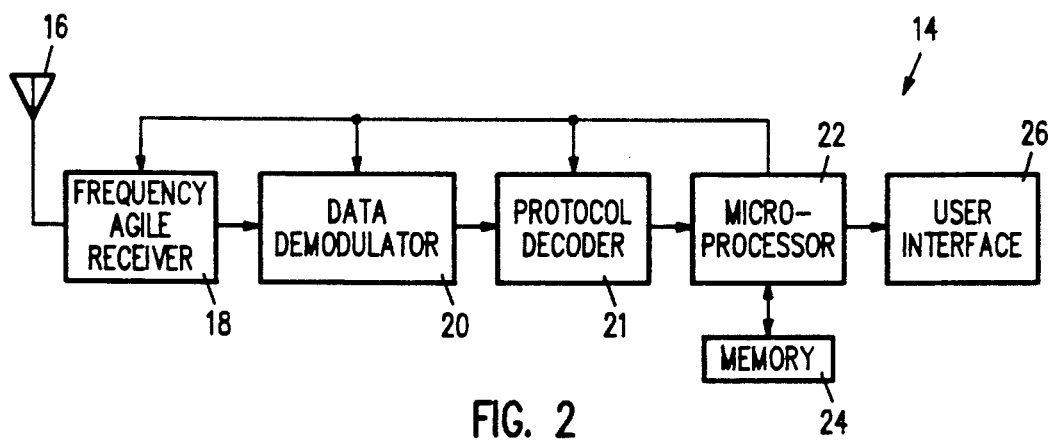
FIG. 2 is a schematic block diagram illustrating a wristwatch paging receiver used in the system of FIG. 1.
Figure 3:
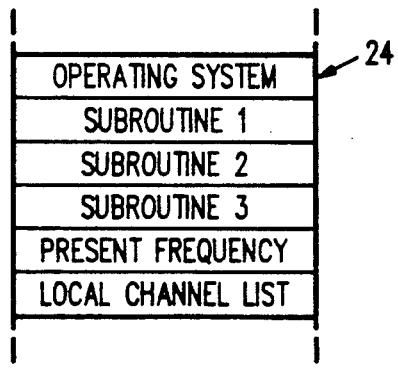
FIG. 3 is a block diagram illustrating the partial contents of a microprocessor memory used in the paging receiver of FIG. 2.

The wristwatch paging receivers 14 are worn by the customers and receive the paging messages broadcast by the broadcast facilities. A block diagram of such a receiver is shown in FIG. 2. The receiver basically includes an antenna 16, a frequency agile receiver 18, a data demodulator 20, a protocol decoder 21, a microprocessor 22 (with associated memory 24) and a user interface 26. Memory 24 contains various data and programs relating to operation of the watch, such as a subroutine for finding a new station, a subroutine for obtaining a local channel list, a datum indicative of the frequency to which the watch is presently tuned, and a local channel list. FIG. 3 illustrates some of the contents of this memory 24.

To review operation of the receiver briefly, antenna 16 receives radio frequency signals in the desired reception band (here 88 to 108 MHz) and couples them to the frequency agile receiver 18. The frequency agile receiver 18 processes the RF signals from the antenna and produces baseband output signals corresponding to a desired FM station within the reception band—typically an FM signal carrying the paging data on an SCA subcarrier thereof. This SCA paging data is detected by the data demodulator 20, decoded by the protocol decoder 21 and is provided to the microprocessor 22 for processing. The microprocessor 22 drives the user interface 26 to alert the user of paging messages.

As described in greater detail in the above-referenced copending application, local channel lists are transmitted to the pagers and provide a list of alternative channels to which the pager can refer if the channel presently being received becomes unreliable. For background, it may be helpful to review operation of that system.

The paging signals received by the receiver 14 are formatted as sequences of packets. The first three packets of each sequence are termed "control" packets. The first of the control packets is termed the "control 0" packet and contains the date and time and the first entry of the channel list. The second packet is termed the "control 1" packet and contains the other entries in the channel list. The third packet is a spare. These three control packets are followed by 1024 "data" packets in which the paging data is transmitted. Subsequent sequences are similarly formatted. A new sequence (or "subframe") of 1027 packets is transmitted every 14.0625 seconds.

When a paging receiver is reset or newly-energized, it first begins a spectrum wide scan for a station carrying the paging data. When such a station is found, the receiver decodes the first and second packets and stores the local channel list contained therein into microprocessor memory 24. Thereafter, the receiver continues to operate on the original channel until there is a failure in reception, such as receipt of a packet with uncorrectable errors. When such an event occurs, the receiver tunes other channels in the local list until good data is again received.

It will be recognized that if the receiver is moved to a new geographical area, the local channel list stored in its memory 24 may not reflect the paging channels used in the new area. When the station presently tuned becomes unreliable, a search through the channels listed in the local channel list may be unavailing. Unless action is taken by the user to intervene and reset the watch to begin a spectrum-wide search for a new satisfactory paging channel, the receiver battery may become drained.

Figure 4:
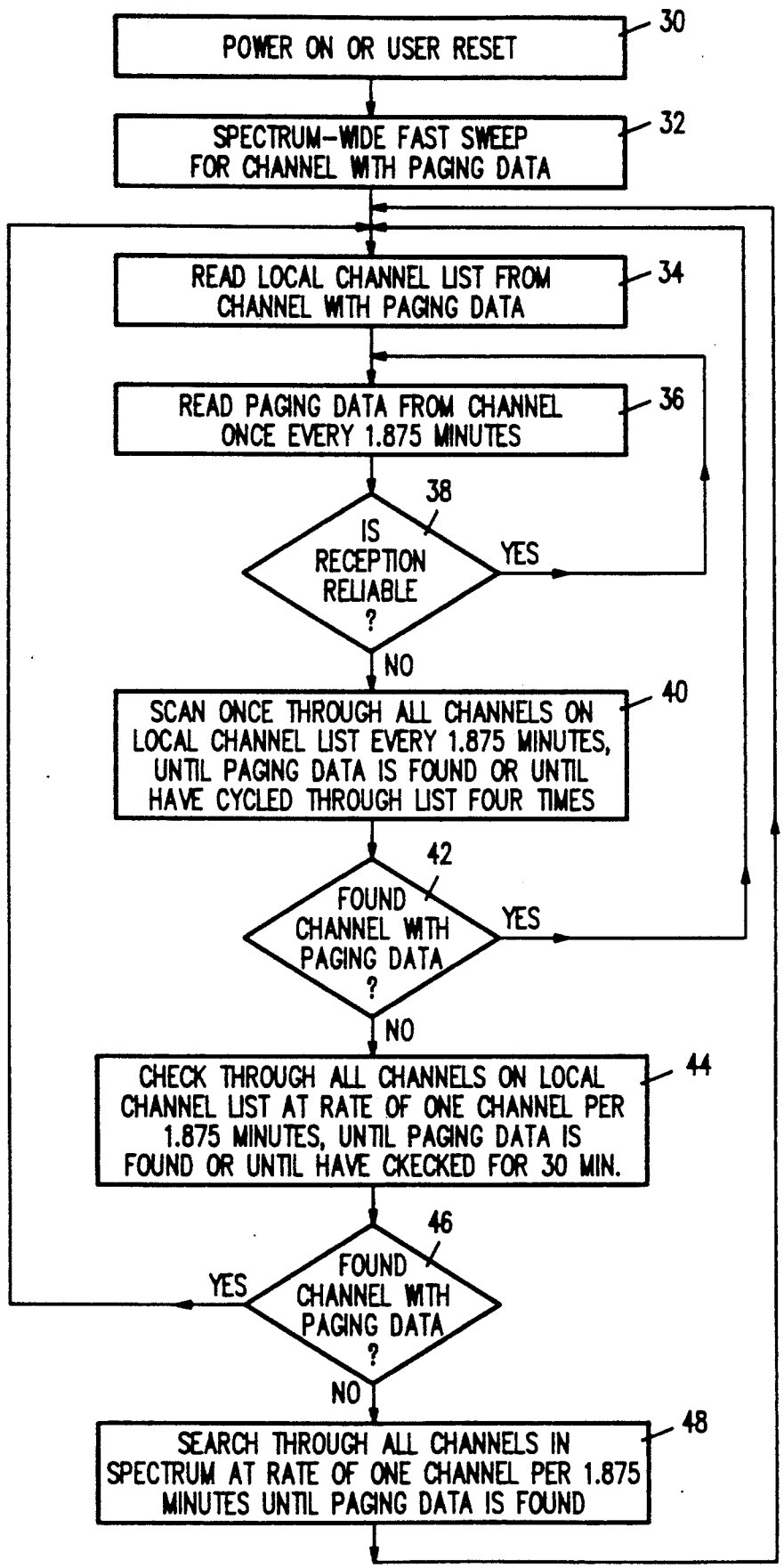
FIG. 4 is a flow chart illustrating a station searching routine stored in the memory of FIG. 3.

According to an aspect of the present invention, the search procedure of the receiver follows the steps illustrated in the flow chart of FIG. 4. On power-on (or on activation of a reset button by the user), the microprocessor 22 causes the frequency agile receiver 18 to begin a fast sweep of the entire FM broadcast spectrum, 88.1 to 107.9 MHz in increments of 0.2 MHz, until a channel with paging data is located. When such a channel is located, the receiver reads the local channel list transmitted in the control 0 and control 1 packets thereof and stores the list in memory 24. Thereafter, the receiver momentarily paging messages directed to the receiver's user. As long as reception on this channel continues to be reliable, the receiver stays in this low energy mode of operation, simply listening periodically for paging messages.

If the user moves the receiver 14 to a new location in which reception is impaired, the receiver will detect the loss of paging data utilizing a CRC error. This error prompts the microprocessor 22 to begin a scan through all the channels listed in the local channel list for an alternative source of paging signals. The transmission on these channels are generally all time-staggered relative to one another, so the receiver can tune to the first alternative channel for a given frame of information and, if unsuccessful, can tune to the next alternative channel, and so forth, all within the frame period of 1.875 minutes. In the illustrated embodiment, this scan continues for four complete cycles through the local channel list (i.e. a maximum period of 7.5 minutes) looking for paging data.

If the receiver's loss of the original signal was caused by some transitory effect, such as a momentary incident of multipath while the user drove between buildings in a downtown area, the receiver quickly resumes reception of paging signals, generally without loss of a single frame of data since each channel transmits each frame in time-staggered relation. If, however, the receiver has not reacquired a paging signal within this 7.5 minute scan time, the microprocessor presumes the signal loss is not of momentary duration and ceases the receiver's relatively high energy scan operation. (If there are seven stations in the local channel list, the energization of the receiver seven times every 1.875 minutes during this scanning operation consumes power at a rate of seven times that consumed during normal operation, in which the receiver is energized only once every 1.875 minutes.)

If the microprocessor concludes that the loss of signal is not merely transitory, it may optionally continue its checking though the local channel list, but at a slower rate, such as one channel every 1.875 minutes. This operation consumes power at the same rate as the normal receiving mode of operation, yet concentrates the search among the channels most likely to be carrying paging signals. In the illustrated embodiment, this checking mode continues for 30 minutes.

If no paging signal is located using the above procedures, the microprocessor then instructs the frequency agile receiver to institute a spectrum-wide search. This search is desirably conducted at a relatively slow rate, such as one channel every 1.875 minutes, to conserve battery power. If desired, the microprocessor can be programmed to begin this mode of operation with one fast sweep through the spectrum, and thereafter continue the search at the more relaxed pace. This low energy search continues until a paging signal is finally found.

By the foregoing arrangement, a paging receiver is able to quickly recover from transitory conditions that render a particular transmission unreliable simply by switching to another channel listed in a local channel list. If a signal failure cannot be quickly cured by resort to one of these other channels, the receiver reduces battery drain by checking among the listed channels more slowly. If this limited search continues to prove unavailing, the receiver widens the search to encompass the entire paging spectrum but operates at a rate that consumes little battery energy. Thus, the battery energy is expended where it is most likely to do the most good, with a high energy search among the most likely channels and a progressively lower energy search as the likelihood of quickly finding a station diminishes.

Having described and illustrated the principles of our invention with reference to a preferred embodiment and several variations thereon, it will be apparent that the invention can be modified in arrangement and detail without departing from such principles. Accordingly, we claim as our invention all such embodiments as may come within the scope and spirit of the following claims and equivalents thereto.

We claim:

1. In a battery operated radio pager receiver which can receive signals on a plurality of different frequencies in a frequency spectrum, said receiver only requiring activation for a very short period of time in order to determine if a paging signal is present at a particular frequency, the amount of power expended by said receiver during a particular period of time being dependent upon the number of frequencies sampled during said period of time, the combination of, fast sweep means operable when said receiver is first activated for conducting a fast spectrum wide frequency sweep to locate a first frequency with a paging signal, regular cycle means operable when said first frequency is located for initially receiving a first list of frequencies which have paging signals broadcast thereon, means for periodically receiving paging signals on said first frequency, local list fast scanning means operable when a signal is not received on said first frequency after initially receiving said first list, for scanning at a fast scanning rate through all the frequencies on said first list to locate a frequency with a paging signal, and for activating said regular cycle means when a signal is located, local list slow scan means operable when a paging signal is not located by said local list fast scanning means for scanning for a first period of time at a slow scanning rate through all the frequencies on said first list to locate a frequency, means activating said regular cycle means when said local list slow scan finds a frequency with a paging signal, and means operable when said local list slow scan means does not find a frequency with a paging signal for searching through all frequencies in said spectrum at a very slow rate until a frequency with a paging signal is located, whereby said battery life is extended by using a combination of slow and fast frequency scanning and frequency sweeping.

2. In a battery operated radio paging device, the method of searching in a frequency spectrum for a radio frequency carrying a pager signal without unduly draining said battery, said pager including a local list of radio frequencies on which signals are being broadcast comprising the steps of, scanning through the frequencies on said local list at a first speed which is a relatively high rate of speed to locate a frequency with a paging signal, when no frequency with a paging signal is found within a first period, reducing the rate of speed at which said scanning proceeds to a second speed, and continuing to scan through said local list local list for a second period of time, and when no frequency is found with a paging signal searching through said entire spectrum of frequencies at a third speed which is a slow rate to find a frequency which has a paging signal and a new local list of radio frequencies, whereby the rate of expenditure of battery energy is reduced by using a plurality of scanning speeds under different conditions.

3. A method of operating a radio pager in a system where the same message is broadcast on a plurality of frequencies, comprising the steps:

providing the pager with a local list of paging frequencies on which said message is broadcast;

periodically changing frequencies to another frequency on said list listening for a paging signal of said frequencies;

when a paging signal is not reliably received on a frequency, then scanning among the frequencies on said local list to find a paging signal, said scanning occurring at a first rate which is faster rate than the periodic changing frequencies rate;

when the scanning is unable to locate a paging signal within a predetermined interval of time, then slow scanning among the frequencies on the local list to find a paging signal, said slow scanning checking occurring at a slower rate than the said scanning rate; and when said slow scanning is unable to locate a paging signal within a predetermined interval, then searching among a larger list of frequencies to find a paging signal, said searching occurring at a rate slower than said first rate.

* * * * *